(12) United States Patent
McElrath et al.

(10) Patent No.: US 10,489,223 B2
(45) Date of Patent: Nov. 26, 2019

(54) METHODS AND APPARATUS FOR SCHEDULING TIME SENSITIVE OPERATIONS AMONG INDEPENDENT PROCESSORS

(71) Applicant: Apple Inc., Cupertino, CA (US)

(72) Inventors: Jason McElrath, Cupertino, CA (US); Karan Sanghi, San Jose, CA (US); Saurabh Garg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/840,473

(22) Filed: Dec. 13, 2017

(65) Prior Publication Data

US 2019/0042336 A1    Feb. 7, 2019

Related U.S. Application Data

(60) Provisional application No. 62/542,194, filed on Aug. 7, 2017.

(51) Int. Cl.
*G06F 9/54* (2006.01)
*G06F 13/362* (2006.01)
(Continued)

(52) U.S. Cl.
CPC .............. *G06F 9/546* (2013.01); *G06F 9/466* (2013.01); *G06F 13/1673* (2013.01); *G06F 13/3625* (2013.01); *G06F 13/4291* (2013.01); *H04L 25/00* (2013.01); *H04W 72/12* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 4,805,137 A | 2/1989 | Grant et al. | |
| 4,987,529 A | 1/1991 | Craft et al. | |
| (Continued) | | | |

FOREIGN PATENT DOCUMENTS

| | | |
|---|---|---|
| EP | 3013008 A1 | 4/2016 |
| JP | 2004086792 A | 3/2004 |
| (Continued) | | |

OTHER PUBLICATIONS

ECN L1 PM Substates with CLKREQ approved Aug. 23, 2012.
(Continued)

*Primary Examiner* — Syed A Roni
(74) *Attorney, Agent, or Firm* — Gazdzinski & Associates, PC

(57) ABSTRACT

Methods and apparatus for scheduling time sensitive operations among independent processors. In one embodiment, an application processor (AP) determines transmission timing parameters for a baseband processor (BB). Thereafter, the AP can generate and transact generic time-sensitive real-time transport protocol (RTP) data with the BB in time for transmission via a Long Term Evolution (LTE) communication stack. In this manner, the AP's scheduler can coordinate/accommodate digital audio tasks within the context of its other tasks (e.g., to enable intelligent sleep and wake-up operation, load balancing, memory usage, and/or any number of other processor management functions).

20 Claims, 6 Drawing Sheets

(51) Int. Cl.
*H04L 25/00* (2006.01)
*G06F 9/46* (2006.01)
*G06F 13/16* (2006.01)
*G06F 13/42* (2006.01)
*H04W 84/04* (2009.01)
*H04W 72/12* (2009.01)

(56) References Cited

U.S. PATENT DOCUMENTS

| | | |
|---|---|---|
| 5,367,688 A | 11/1994 | Croll |
| 5,467,459 A | 11/1995 | Alexander et al. |
| 5,485,578 A | 1/1996 | Sweazey |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,233,702 B1 | 5/2001 | Horst et al. |
| 6,260,152 B1 | 7/2001 | Cole et al. |
| 6,359,863 B1 | 3/2002 | Varma et al. |
| 6,411,997 B1 | 6/2002 | Dawes et al. |
| 6,434,633 B1* | 8/2002 | Braun |
| 6,523,073 B1 | 2/2003 | Kammer et al. |
| 6,553,446 B1 | 4/2003 | Miller |
| 6,693,895 B1 | 2/2004 | Crummey et al. |
| 6,735,642 B2 | 5/2004 | Kagan et al. |
| 6,947,442 B1 | 9/2005 | Sato et al. |
| 6,948,094 B2 | 9/2005 | Schultz et al. |
| 6,990,594 B2 | 1/2006 | Kim et al. |
| 7,100,020 B1 | 8/2006 | Brightman et al. |
| 7,127,600 B2 | 10/2006 | Zimmer et al. |
| 7,191,240 B1 | 3/2007 | Johnson |
| 7,281,172 B2 | 10/2007 | Chujo |
| 7,397,774 B1 | 7/2008 | Holland et al. |
| 7,398,382 B2 | 7/2008 | Rothman et al. |
| 7,506,084 B2 | 3/2009 | Moertl et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verma et al. |
| 7,685,476 B2 | 3/2010 | Andre et al. |
| 7,802,256 B2 | 9/2010 | Havens et al. |
| 7,853,731 B1 | 12/2010 | Zeng |
| 7,899,941 B2 | 3/2011 | Hendry et al. |
| 7,908,335 B1 | 3/2011 | Citterelle et al. |
| 7,941,682 B2 | 5/2011 | Adams |
| 8,255,725 B2 | 8/2012 | Shimazaki et al. |
| 8,352,624 B2 | 1/2013 | Zimmerman et al. |
| 8,422,404 B2 | 4/2013 | Taki |
| 8,468,285 B2 | 6/2013 | Kobayashi |
| 8,555,099 B2 | 10/2013 | Marinkovic et al. |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,808,091 B2 | 8/2014 | Shaw et al. |
| 8,819,386 B1 | 8/2014 | Mather |
| 8,832,331 B2 | 9/2014 | Co |
| 8,848,809 B2 | 9/2014 | Whitby-Strevens |
| 8,914,649 B2 | 12/2014 | So et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,544,069 B2 | 1/2017 | Whitby-Strevens et al. |
| 9,547,535 B1 | 1/2017 | Wilt |
| 9,568,970 B1 | 2/2017 | Kaushal et al. |
| 9,582,448 B2 | 2/2017 | Saitou |
| 9,594,718 B2 | 3/2017 | Kaushik et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,959,124 B1 | 5/2018 | Herbeck et al. |
| 2002/0013868 A1 | 1/2002 | West |
| 2002/0044553 A1 | 4/2002 | Chakravorty |
| 2002/0065867 A1 | 5/2002 | Chauvel |
| 2002/0169938 A1 | 11/2002 | Scott et al. |
| 2003/0014607 A1 | 1/2003 | Slavin et al. |
| 2003/0086122 A1 | 5/2003 | Parry |
| 2003/0200413 A1 | 10/2003 | Gurumoorthy et al. |
| 2004/0044929 A1 | 3/2004 | Chujo |
| 2004/0064589 A1 | 4/2004 | Boucher et al. |
| 2004/0128568 A1 | 7/2004 | O'Shea |
| 2004/0201749 A1 | 10/2004 | Malloy Desormeaux |
| 2004/0221056 A1 | 11/2004 | Kobayashi |
| 2004/0228365 A1 | 11/2004 | Kobayashi |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0157781 A1 | 7/2005 | Ho et al. |
| 2005/0285862 A1 | 12/2005 | Noda et al. |
| 2006/0047989 A1 | 3/2006 | Delgado et al. |
| 2006/0107071 A1 | 5/2006 | Girish et al. |
| 2006/0218301 A1 | 9/2006 | O'Toole et al. |
| 2007/0005869 A1 | 1/2007 | Balraj et al. |
| 2007/0043901 A1 | 2/2007 | Wu et al. |
| 2007/0070997 A1 | 3/2007 | Weitz et al. |
| 2007/0180041 A1 | 8/2007 | Suzuoki |
| 2007/0201492 A1 | 8/2007 | Kobayashi |
| 2007/0226417 A1 | 9/2007 | Davis |
| 2007/0286246 A1 | 12/2007 | Kobayashi et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee, II et al. |
| 2009/0024924 A1 | 1/2009 | Kim |
| 2009/0113141 A1 | 4/2009 | Bullman et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2010/0017655 A1 | 1/2010 | Gooding et al. |
| 2010/0030932 A1 | 2/2010 | Ergas et al. |
| 2010/0082859 A1 | 4/2010 | Hendry et al. |
| 2010/0098419 A1 | 4/2010 | Levy et al. |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1* | 10/2011 | Rathonyi |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0159513 A1 | 6/2012 | Pakhunov et al. |
| 2012/0224640 A1 | 9/2012 | Sole Rojals et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0124895 A1 | 5/2013 | Saha et al. |
| 2013/0138840 A1 | 5/2013 | Kegel et al. |

(56) References Cited

U.S. PATENT DOCUMENTS

| | | |
|---|---|---|
| 2013/0162911 A1 | 6/2013 | Glen |
| 2013/0290947 A1 | 10/2013 | Li |
| 2014/0033220 A1 | 1/2014 | Campbell et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang et al. |
| 2014/0215236 A1* | 7/2014 | Heinrich |
| 2014/0244866 A1 | 8/2014 | Manula et al. |
| 2014/0247983 A1 | 9/2014 | MacInnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0293873 A1 | 10/2015 | Shao et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez Gracia et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0224442 A1 | 8/2016 | Sanghi et al. |
| 2016/0269991 A1 | 9/2016 | Van Greunen et al. |
| 2016/0299860 A1 | 10/2016 | Harriman |
| 2016/0363955 A1 | 12/2016 | Stevens et al. |
| 2016/0364350 A1 | 12/2016 | Sanghi et al. |
| 2017/0108912 A1 | 4/2017 | Li et al. |
| 2017/0177222 A1 | 6/2017 | Singh et al. |
| 2017/0228481 A1 | 8/2017 | Pusuluri et al. |
| 2017/0249098 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Havvtof et al. |
| 2018/0225251 A1 | 8/2018 | Sthoeger et al. |
| 2018/0367460 A1 | 12/2018 | Gao et al. |
| 2019/0042525 A1 | 2/2019 | McElrath et al. |
| 2019/0073011 A1 | 3/2019 | Paterson et al. |

FOREIGN PATENT DOCUMENTS

| | | |
|---|---|---|
| JP | 2012108677 A | 6/2012 |
| JP | 2013246642 A | 12/2013 |
| JP | 2015001867 A | 1/2015 |
| KR | 20150041072 A | 4/2015 |
| KR | 20150079788 A | 7/2015 |
| WO | WO-2008070138 A2 | 6/2008 |

OTHER PUBLICATIONS

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Jackson, "PCI Express Technology", Sep. 2012 (Sep. 2012), MindShare Press, XP002777351, pp. 49,86,87,712-723.

\* cited by examiner

METHODS AND APPARATUS FOR SCHEDULING TIME SENSITIVE OPERATIONS AMONG INDEPENDENT PROCESSORS

PRIORITY

This application claims priority to U.S. Provisional Patent Application Ser. No. 62/542,194, entitled "METHODS AND APPARATUS FOR TIME SENSITIVE DATA TRANSFER BETWEEN CLOCK DOMAINS," filed Aug. 7, 2017, the foregoing being incorporated herein by reference in its entirety.

RELATED APPLICATIONS

This application is related to commonly owned and co-pending U.S. patent application Ser. No. 15/720,603, entitled "METHODS AND APPARATUS FOR TRANSMITTING TIME SENSITIVE DATA OVER A TUNNELED BUS INTERFACE," filed Sep. 29, 2017, the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronics devices, as well as networks thereof. More particularly, the disclosure is directed to methods and apparatus for scheduling time sensitive operations among independent processors. In one exemplary aspect, methods and apparatus are disclosed for generating real-time transport protocol (RTP) data in an application processor (AP) for transmission via a baseband processor (BB).

2. Description of Related Technology

Cellular networks provide wireless network connectivity via a network of physical "cell" areas. Each cell is serviced by a base station; a subscriber device connects to the base station via a wireless connection. As a cellular device moves between cells, its data connection can be "handed over" from one cell to another cell. In this manner, a cellular network enables service reception over a much larger geographic footprint than any single base station could provide alone.

Most cellular devices have an application processor (AP) and a modem (also commonly referred to as "baseband") processor (BB). Generally, the application processor is responsible for device-specific functions (e.g., execution of the operating system, and any local applications) whereas the modem manages the data connection to the cellular network.

As a brief aside, recent devices (such as the iPhone®, manufactured by the Assignee hereof) use an inter-processor communication (IPC) link to provide high speed data transfer between the application processor (AP) and baseband processor (BB). The IPC link offers a plethora of advantages in addition to high speed data transfers; for example, the IPC link allows the AP and BB to decouple their operation from one another to e.g., reduce software complexity, minimize power consumption, simplify clock requirements, and the like. In other words, the application processor and modem may have different software code bases, different power domains, different clock domains, etc.

Consumer experience is predominantly influenced by the depth, variety, and richness of the software ecosystem (both native and third-party applications). To these ends, device manufacturers have designed products with cutting edge (and commensurately expensive) application processors. Cellular network technology has also improved, and the cost of baseband processors has risen. However, a more expensive modem increases the manufacturer's bill of material (BOM) costs (and by extension, consumer prices) with negligible improvements to consumer experience. In order to optimize the tradeoff between consumer experience and consumer cost, device manufacturers would like to explore designs with less capable and/or commodity modems that are paired with high end application processors.

Some critical functionality is handled by the modem for historical and/or technical reasons. For example, voice applications are isochronous and require dedicated network bandwidth to maintain acceptable quality (which is managed by the modem). These design constraints have steadily decreased in significance, since most modern APs can easily handle voice codec operations in software. Unfortunately, existing asynchronous bus technologies (e.g., the aforementioned IPC link) that isolate the AP from the BB are ill-equipped to handle isochronous voice coding requirements within the context of cellular network constraints.

To these ends, methods and apparatus are needed that enable the application processor to appropriately compensate for differences in clock domains of the modem, and vice versa. More generally, improved methods and apparatus are needed for scheduling time sensitive operations among independent processors.

SUMMARY

The present disclosure satisfies the foregoing needs by providing, inter alia, systems, methods, and apparatus for scheduling time sensitive operations among independent processors.

In a first aspect, a method for time sensitive data transfer between clock domains is disclosed. In one embodiment, the method includes operating a first processor independently of a second processor, the first and second processors operating in independent clock domains; responsive to a time sensitive processor transaction: determining a time reference for the second processor; adjusting the time sensitive processor transaction for the time reference of the second processor at the first processor; providing the adjusted time sensitive processor transaction to the second processor from the first processor; and causing the second processor to perform the adjusted time sensitive processor transaction.

In a second aspect, a computerized apparatus is disclosed. In one embodiment, the computerized apparatus includes a user equipment apparatus having a host processing apparatus that is coupled with an endpoint (e.g., peripheral) processing apparatus via a physical bus interface. The physical bus interface may include a PCIe/IPC link. The computerized apparatus is configured to operate in accordance with the method for time sensitive data transfer between clock domains as described supra.

In a third aspect, an application processor is disclosed. In one embodiment, the applications processor includes a root complex, a central processing unit, a main memory unit and memory. The application processor is configured to operate in accordance with the method for time sensitive data transfer between clock domains as described supra.

In a fourth aspect, an endpoint processor is disclosed. In one embodiment, the endpoint processor includes an endpoint, a central processing unit, a main memory unit and memory. The endpoint processor is configured to operate in accordance with the method for time sensitive data transfer between clock domains as described supra.

In a fifth aspect, a computer readable apparatus is disclosed. In one embodiment, the computer readable apparatus includes a storage medium having computer readable instructions stored thereon, the computer readable instructions when executed by a processor apparatus is configured to operate in accordance with the method for time sensitive data transfer between clock domains as described supra.

In a sixth aspect, computerized logic is disclosed. In one embodiment, the computerized logic is configured to operate in accordance with the method for time sensitive data transfer between clock domains as described supra.

In a seventh aspect, a method for scheduling time sensitive operations among independent processors is disclosed. In one embodiment, the method includes: operating a first processor independently of a second processor; obtaining scheduling parameters of the second processor; receiving a synchronization signal of the second processor; generating one or more transactions for a time sensitive application based on the obtained scheduling parameters and the received synchronization signal; and providing the one or more transactions to the second processor via a shared transaction protocol.

In one variant, the first processor operates within a first clock domain and the second processor operates within a second clock domain.

In another variant, the method includes executing an operating system (OS) and one or more applications via the first processor, and causing the second processor to connect to a wireless network. In one such variant, obtaining the scheduling parameters further includes obtaining an uplink and downlink transmission schedule timing for the wireless network. In another such variant, receiving the synchronization signal includes receiving an out-of-band general purpose input output (GPIO) edge signal transmitted by the second processor. In still another variant, receiving the synchronization signal includes receiving an in-band doorbell signal transmitted by the second processor.

In one variant, generating the one or more transactions includes executing a digital audio codec to generate the one or more transactions. For example, generating the one or more transactions for the time sensitive application may include placing a voice call over a Long Term Evolution (LTE) cellular network. In one such case, the shared transaction protocol includes a real-time transport protocol (RTP) configured to support multiple real-time applications.

In an eighth aspect, a user apparatus is disclosed. In one exemplary embodiment, the user apparatus includes: a first processor configured to execute an operating system (OS) and one or more applications; a second processor configured to communicate with a wireless network; an inter-processor communication (IPC) link coupled to the first processor and the second processor; and a non-transitory computer readable medium. In one exemplary embodiment, the one or more instructions are configured to, when executed by the first processor, cause the first processor to: obtain scheduling parameters from the second processor; receive a synchronization signal associated with the second processor; generate one or more transactions for a time sensitive application based on the obtained scheduling parameters and the received synchronization signal; and provide the one or more transactions to the second processor via a shared transaction protocol.

In one variant, the generation of one or more transactions for the time sensitive application includes execution of a virtualized task of the second processor.

In another variant, the execution of the virtualized task of the second processor includes execution of a digital audio codec for a cellular network application. In one such case the cellular network application is a voice call.

In still another variant, the user apparatus includes a second non-transitory computer readable medium including one or more instructions that when executed by the second processor cause the second processor to determine the scheduling parameters based on the wireless network schedule. In one such variant, the wireless network is a Long Term Evolution (LTE) cellular network.

In another variant, the second non-transitory computer readable medium further includes one or more instructions that when executed by the second processor cause the second processor to transmit the one or more transactions to the LTE cellular network. In one such case, the one or more transactions include real-time transport protocol (RTP) packets including digital audio data.

In a ninth aspect, a first processor apparatus configured to execute an operating system (OS) and one or more applications is disclosed. In one embodiment, the first processor apparatus includes: a processor and a non-transitory computer readable medium including one or more instructions that when executed by the processor, cause the processor to: obtain scheduling parameters from a second processor; receive a synchronization signal associated with the second processor; prioritize a virtualized task associated with the second processor with at least one task associated with the one or more applications; and based on the prioritization, generate one or more transactions for the virtualized task based on the obtained scheduling parameters and the received synchronization signal.

In one variant, the virtualized task includes a time sensitive task. In one such variant, the time sensitive task includes execution of a software digital audio codec. In some cases, the generation of one or more transactions includes generation of one or more real-time transport protocol (RTP) packets.

In another variant, the prioritization of the time sensitive task is based on the obtained scheduling parameters.

Other features and advantages of the present disclosure will immediately be recognized by persons of ordinary skill in the art with reference to the attached drawings and detailed description of exemplary embodiments as given below.

All Figures© Copyright 2017 Apple Inc. All rights reserved.

DETAILED DESCRIPTION

Reference is now made to the drawings, wherein like numerals refer to like parts throughout.

Detailed Description Of Exemplary Embodiments

Exemplary embodiments of the present disclosure are now described in detail. While these embodiments are primarily discussed in the context of an inter-processor communication (IPC) link, it will be recognized by those of ordinary skill that the present disclosure is not so limited. In fact, the various aspects of the disclosure are useful in any device or network of devices that is configured to incorporate and coordinate time-sensitive operations among independent processors as is disclosed herein.

While the following embodiments describe specific implementations of e.g., dedicated address spaces, legacy support capabilities, and specific protocols, those of ordinary skill in the related arts will readily appreciate that such descriptions are purely illustrative.

Inter-Processor Communications Link—

Bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for most portable consumer electronics applications. Additionally, PCIe connectivity is unable to accommodate scenarios where the "peripheral" processor is required to operate while the "host" processor is asleep or vice versa (as is common with e.g., cellular devices and portable media players).

Figure 1:
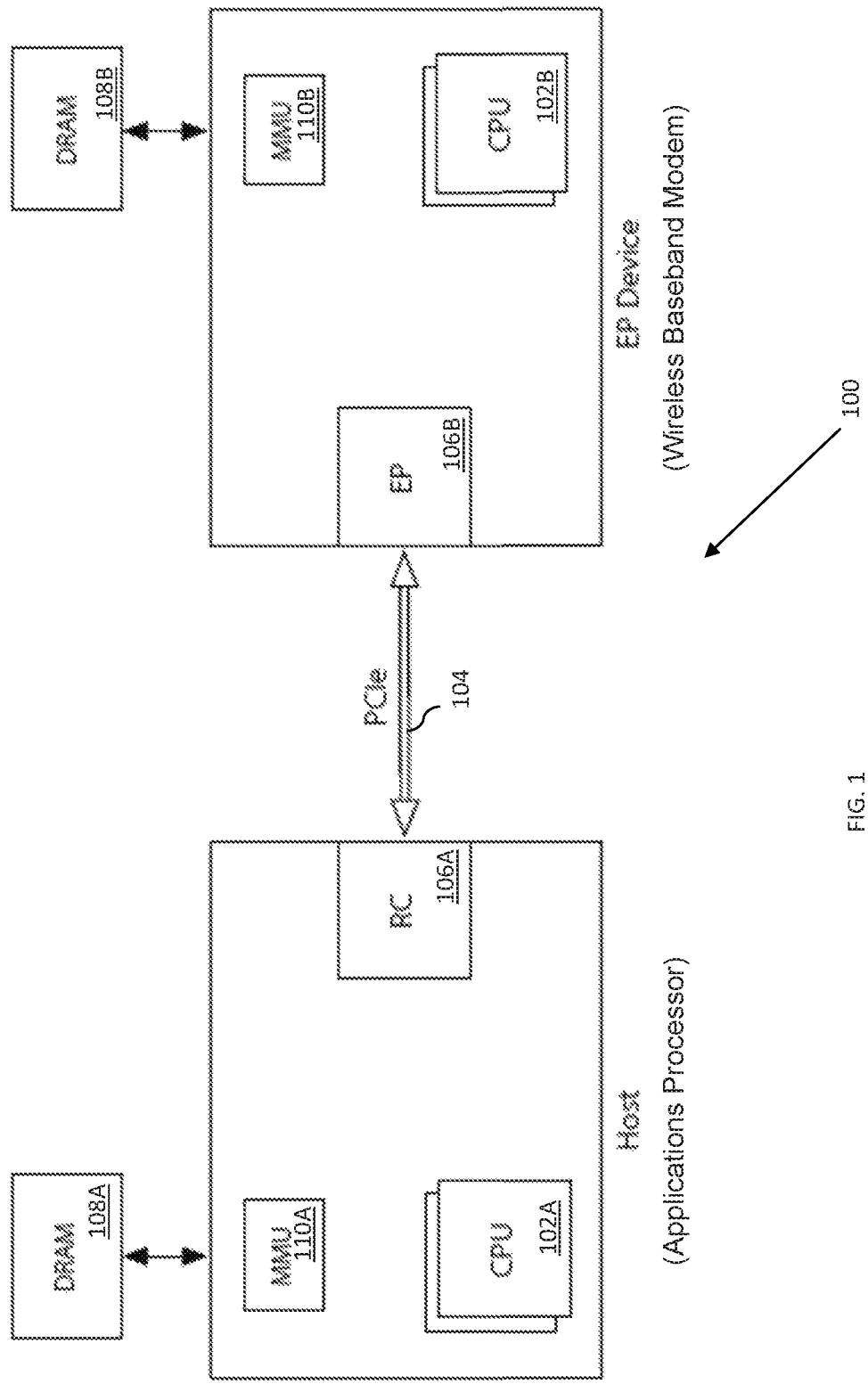
FIG. 1 is a logical block diagram of one exemplary apparatus useful for illustrating various principles described herein.

Current designs have modified PCIe for inter-processor communication (IPC) between two (or more) independently operable processors. For example, FIG. 1 illustrates one exemplary apparatus 100 useful for illustrating IPC operation. As shown, the apparatus 100 includes a first processor 102A and second processor 102B, and a physical bus interface 104 that is configured to implement an inter-processor communication (IPC) link between two (or more) independently operable processors.

Unlike extant PCIe connectivity, the exemplary IPC link 104 accommodates independent operation use scenarios where the "peripheral" processor is required to operate while e.g., the "host" processor is asleep, unavailable, and/or non-functional (and vice versa). Such operational scenarios and requirements are described in greater detail within e.g., commonly owned U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015; and Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, each of the foregoing incorporated herein by reference in its entirety.

In one implementation, the first processor 102A includes an applications processor (AP). As shown in FIG. 1, the first processor 102A is coupled to a Root Complex (RC) 106A which functions as the host of the IPC bus.

In one implementation, the second processor 102B includes a wireless modem. As shown in FIG. 1, the second processor 102B is coupled to an Endpoint (EP) 106B which functions as the peripheral of the IPC bus. Moreover, although not illustrated, it would be readily apparent to one of ordinary skill given the contents of the present disclosure that the disclosed apparatus 100 may include multiple first processors 102A and/or may include multiple second processors 102B, where each of these processors are communicatively coupled using e.g., multiple physical bus interfaces 104, the foregoing depiction in FIG. 1 merely being illustrative of the principles described herein.

As shown, both the first 102A and the second processors 102B are each coupled to a non-transitory computer readable medium (e.g., a respective dynamic random access memory (DRAM) 108A, 108B and a respective memory management unit (MMU) 110A, 110B). The non-transitory computer readable medium is configured to store computer readable instructions for execution by a processor apparatus (e.g., the first and/or second processors (102A, 102B)).

Figure 2:
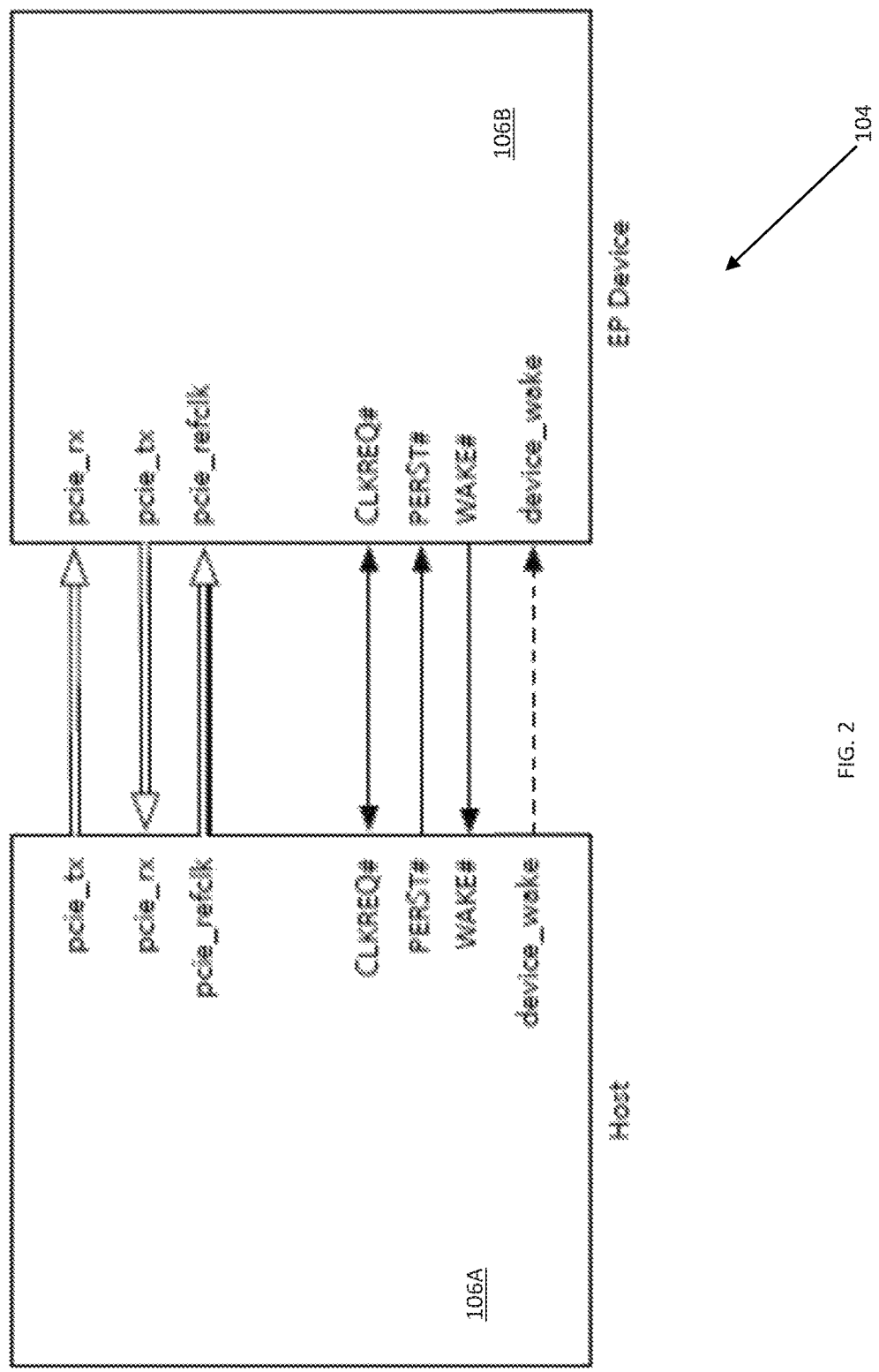
FIG. 2 is a logical block diagram of one exemplary physical bus interface useful in conjunction with the various principles described herein.

FIG. 2 illustrates the exemplary physical bus interface 104. The exemplary physical bus interface 104 can transact data based on a point-to-point communication channel between, for example, two IPC ports (e.g., the RC 106A and EP 106B). During data transactions, the first 102A and second processors 102B can send and/or receive access requests (e.g., configuration read/write, I/O read/write, memory read/write and/or other types of access requests) and interrupts. The link (e.g., physical bus interface 104) is composed of one or more lanes (one shown in FIG. 2), each lane having a receive and a transmit component (e.g., pcie_rx, pci_tx). Each lane is a full-duplex byte stream, transporting data packets in, for example, eight-bit 'byte' formats, between the RC 106A and EP 106B of a link, in both directions simultaneously, although it would be appreciated that other formats may be readily substituted with equal success given the contents of the present disclosure. The physical IPC link 104 may support multiple logical links (or virtual bus interfaces) representing multiple ongoing data sessions. See also e.g., co-owned U.S. patent application Ser. No. 14/856,283, filed Sep. 16, 2015 and entitled "METHODS AND APPARATUS FOR AGGREGATING PACKET TRANSFER OVER A VIRTUAL BUS INTERFACE", the contents of the foregoing incorporated herein by reference in its entirety.

Voice Over LTE (VoLTE) and Voice Over IP (VoIP)—

Figure 3:
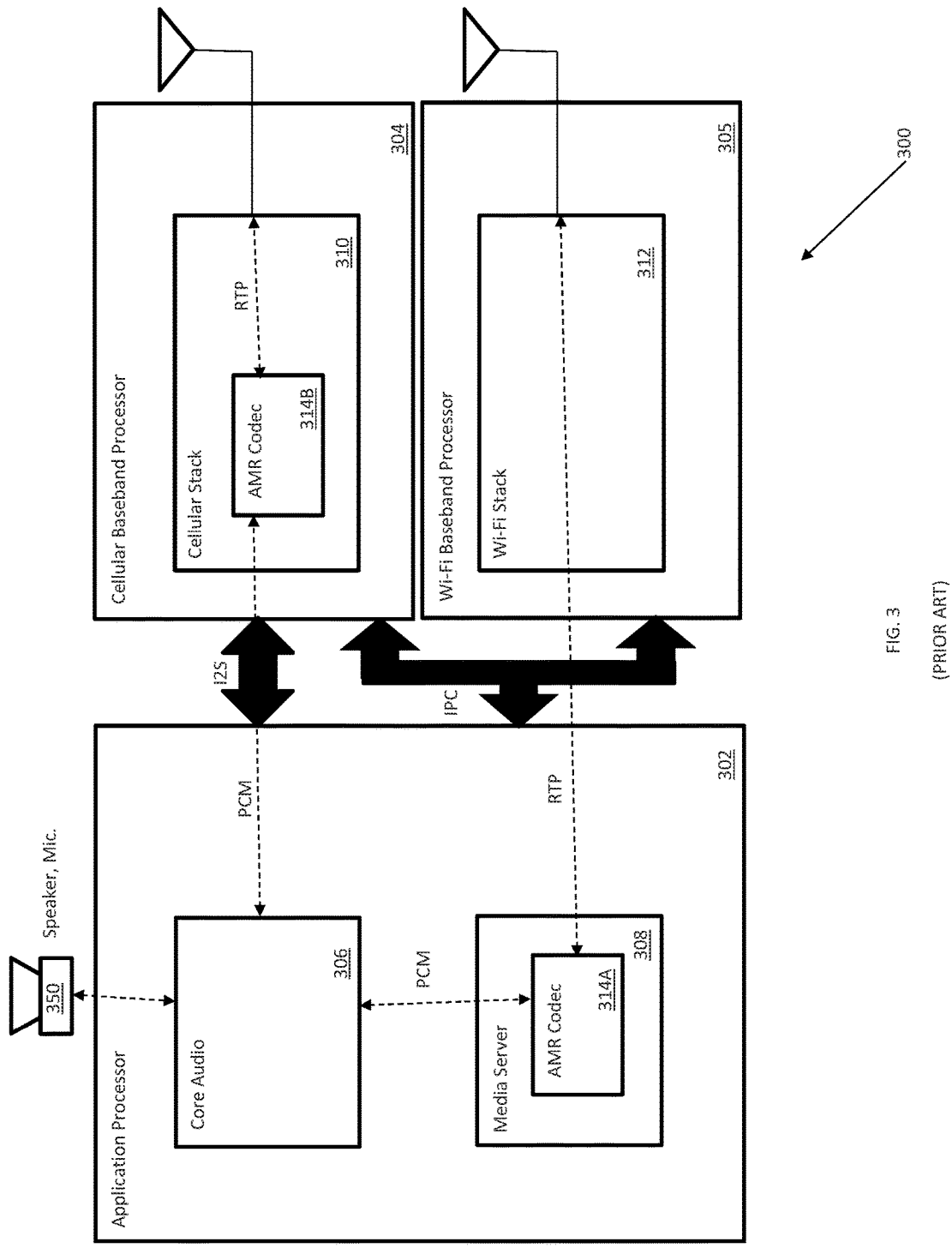
FIG. 3 is a logical representation of a prior art digital audio system.

FIG. 3 is a logical representation of a prior art digital audio system 300 used in, for example, devices manufactured by the Assignee hereof. As shown, the application processor (AP) 302 is coupled to the cellular baseband processor (BB) 304 via an Integrated Inter-IC Sound Bus (I2S) serial bus interface and the aforementioned inter-processor communications (IPC) link. The application processor (AP) 302 may also be coupled to the Wi-Fi baseband processor (BB) 305 via the aforementioned inter-processor communications (IPC) link. The AP 302 executes, for example, Core Audio 306 and Media Server 308 software to provide media services for a variety of applications (e.g., phone calls, multimedia, teleconferencing, etc.). Similarly, the cellular BB 304 executes a cellular communications protocol stack 310 (e.g., a Long Term Evolution (LTE)) and Wi-Fi BB 305 executes a local area communications protocol stack 312 (e.g., a Wi-Fi).

Digital audio can be captured and played back via, for example, a speaker or microphone 350. In some cases, the digital audio device may be incorporated within the device (e.g., a device's native speaker and microphone). Other common use scenarios include external detached speakers and/or microphones (e.g., a Bluetooth headset, wired headset, external speakers, external microphone, or other similar peripheral audio/visual device).

The Core Audio 306 software is the digital audio infrastructure of the operating system (e.g., iOS and OSX, developed by the Assignee hereof) and generates digital audio data. Core Audio services generate, playback and/or manipulate linear pulse-code-modulated (linear PCM) data which is an uncompressed digital audio data format. As a brief aside, digital audio recording creates PCM data by measuring an analog audio signal's magnitude at a sampling rate, and converting each sample to a numerical value. Different types of audio have different PCM data formats. For example, standard compact disc (CD) audio uses a sampling rate of 44.1 kHz, with a 16-bit sample, whereas Adaptive Multi-Rate (AMR) voice codecs use sampling frequencies of 8 kHz with a 13-bit sample (160 samples for 20 ms frames).

The Media Server 308 software provides the network server service for media services (which may include audio, video, text, and/or other media) over a real-time transport protocol (RTP). RTP is a network protocol for delivering media over internet protocol (IP) networks. During operation, an RTP session is established for each multimedia stream. Each session consists of an IP address with a pair of ports for RTP (and RTP control protocol (RTCP)). Unlike so-called "best effort" delivery protocols which are delivered without time constraints (e.g., TCP/IP), RTP data packets include a timestamp that specifies the appropriate playback time for the RTP payload.

The cellular communications protocol stack 310 and local area communications protocol stack 312 are each configured to communicate with peer communication stacks of e.g., a cellular base station or Wi-Fi access point. As is well known in the related arts, a "communication stack" includes multiple logical layers of software such as, inter alia, the physical layer (PHY), medium access control (MAC) layer, etc. Within a device, each layer provides services to the layer above it, and receives services from the layer below. For example, the PHY layer controls access to the physical medium of wireless transmission. The MAC layer builds on the PHY layer, and controls addressing of the device, and coordinates with peer devices to e.g., prevent access collisions. During normal operation, each layer is in logical communication with the counterpart layer of a peer device (the aforementioned base station and/or access point). Higher layers of software provide abstraction from the lower layers. Consequently, the application programming interface (API) can present a simple network interface to a client application, without also presenting the minutiae associated with managing the communication link.

Historically, LTE networks were limited to data only, thus voice calls were supported via a separate network (e.g., CDMA2000 or UMTS) via Circuit Switched Fall Back (CSFB) or similar. In 2014, LTE providers deployed Voice over LTE (VoLTE) to provide voice call capabilities natively over LTE. VoLTE uses RTP to encapsulate PCM data for delivery over the LTE network. Consequently, baseband processors may implement a cellular communications protocol stack 310 that includes an Adaptive Multi-Rate (AMR) voice codec 314A. AMR codecs are optimized for encoding human speech for cellular voice calls at low data rates. Specifically, an AMR codec adapts to changing wireless link conditions by sacrificing voice quality for improved noise rejection and vice versa. For example, if the radio conditions are bad, source coding is reduced and channel coding is increased.

Cellular providers require that network latency is kept very low for VoLTE; e.g., the total roundtrip delay is set to be less than e.g., 200 ms. Additionally, while the exact round trip delay budget for carrier certification may vary across different carriers and different test cases, a high round-trip delay degrades the perceived voice call quality. Thus, device manufacturers generally seek to minimize roundtrip delay even where a roundtrip delay requirement is not imposed by the carriers. VoLTE calls generally deliver data at, for example, 20 ms intervals, although some configurations can use longer (or shorter) intervals.

Unfortunately, the aforementioned inter-processor communication (IPC) link is based on the PCIe bus protocol and does not provide a framework for delivery time guarantees. More directly, the IPC link operates according to an asynchronous protocol which only provides "best effort" delivery that may vary widely from packet to packet. Empirically, these misaligned deliveries can have delays ranging from, for example, 0 ms to 20 ms; unpredictable delays of this scale could be buffered, but such implementations are undesirable for other reasons (e.g., perceptible delays, etc.) Also, if a VoLTE packet is not delivered within the appropriate window for transmission via the cellular network, then the packet must either wait for the next delivery opportunity e.g., usually 20 ms (or a multiple thereof), or is discarded due to the isochronous nature of VoLTE. Due to these constraints, the prior art AP 302 provides PCM data to the AMR codec 314A executing from the cellular BB 304, and can schedule VoLTE RTP data packets in accordance with the LTE cellular network requirements.

It should be noted that the total roundtrip delay requirements for LTE are for the benefit of the transmission schedule of the cellular network; specifically, each LTE radio frame is, for example, 10 ms long. Human perception capabilities are much more forgiving than the cellular network's rigid scheduling, and media applications (such as voice telephony) can provide a seamless user experience with less rigid timing requirements. In fact, artisans of ordinary skill in the related arts will readily appreciate that a VOIP call can be performed over Wi-Fi networks via the Wi-Fi BB 305 using carrier-sense multiple access with collision avoidance (CSMA/CA) based access and RTP delivery with comparable performance. Additionally, most modern application processors (AP) 302 have the capability for voice codec processing over the IPC link. For example, in the illustrated prior art implementation of FIG. 3, the Media Server 308 (executed by the AP 302) software includes a separate AMR voice codec 314A for e.g., voice over IP (VoIP) teleconferencing via Wi-Fi.

In summary, existing cellular device designs are inefficient, inflexible, and expensive. As is illustrated in FIG. 3, existing designs must support redundant software (e.g., the AMR codecs 314A, 314B). From a commercial standpoint, the AP is customer-facing and frequently updated with firmware and/or software improvements, whereas the BB tracks much slower cellular network deployments (which also seldom improve codec implementations). Thus, software codecs can be much more quickly improved and/or modified per customer interest in the AP codebase as compared to the BB codebase. Still further, each codec that is supported within the BB corresponds to a larger memory footprint, faster processor, and more complicated codebase; component manufacturers often charge a premium for more capable components, which directly increases the bill of material (BOM) cost for the device manufacturer.

To these ends, the disclosed embodiments enable an AP to generate data traffic for a BB, in compliance with the cellular network's timing requirements. The BB processor provides only network connectivity, and the codec functionality may be handled entirely, or in part, within the AP. More generally, various embodiments of the present disclosure enable one processor to schedule time sensitive operations for another independent processor. The described solutions compensate for differences in logical domains between multiple independent processor apparatus.

Exemplary Real Time Traffic Over IPC Links—

Figure 4:
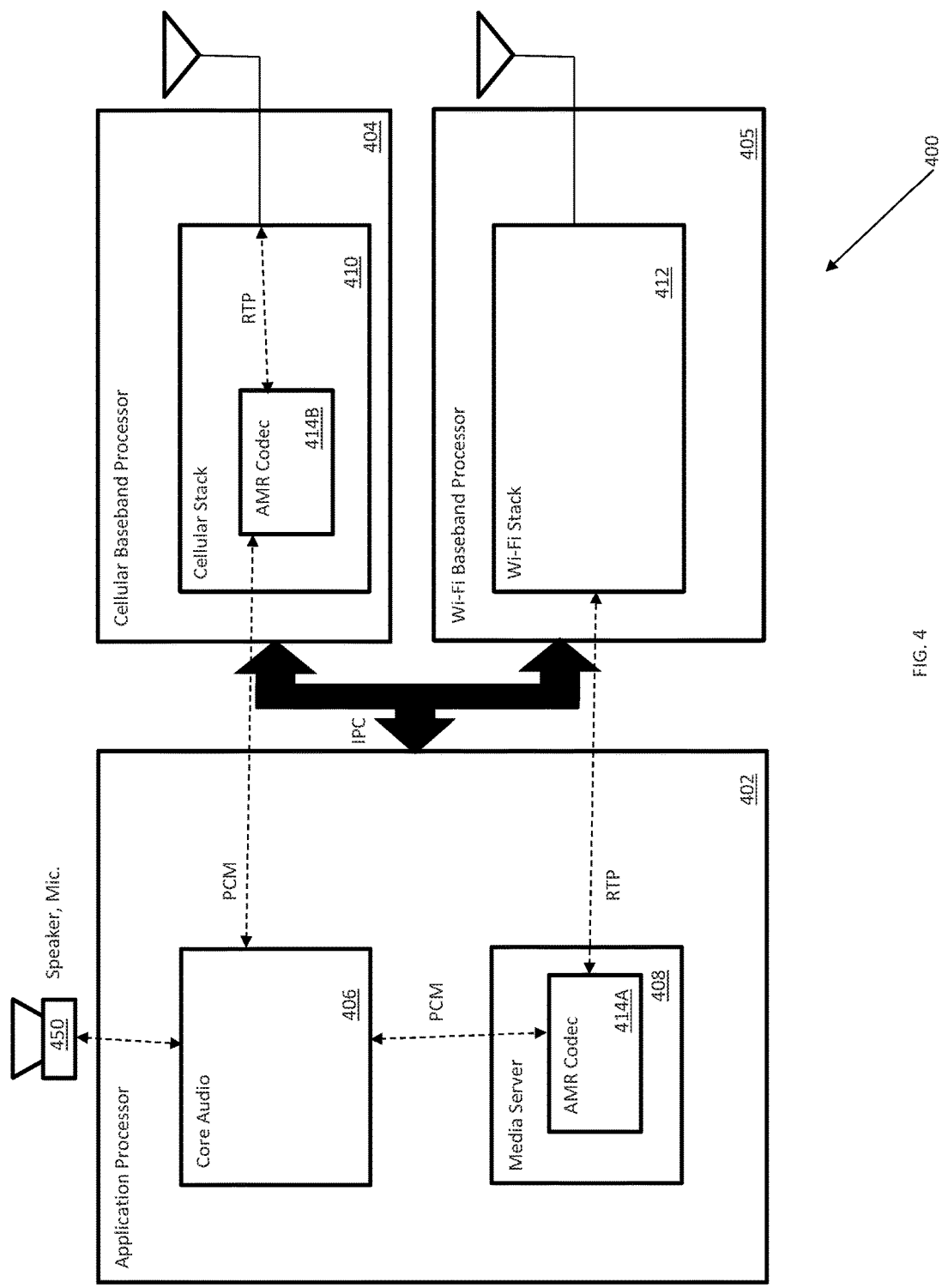
FIG. 4 is a logical block diagram of first audio delivery scheme for use within a cellular network, in accordance with the various principles described herein.

FIG. 4 illustrates a first exemplary digital audio system 400, in accordance with various principles of the present disclosure. As shown in FIG. 4, the application processor (AP) 402 is coupled to the baseband processor (BB) 404 via the aforementioned inter-processor communications (IPC) link, however the Integrated Inter-IC Sound Bus (I2S) serial bus interface has been removed and pulse code modulated (PCM) data is tunneled through the IPC link. As in FIG. 3, the application processor (AP) 402 of FIG. 4 is also coupled to the Wi-Fi baseband processor (BB) 405 via the aforementioned inter-processor communications (IPC) link. In this embodiment, the AP 402 executes Core Audio 406 and Media Server 408 software and continues to rely on the cellular BB 404 and Wi-Fi BB 405 for network connectivity (via e.g., the cellular communications protocol stack 410 or the local area communications protocol stack 412). Digital audio can be captured and played back via an internal and/or external speaker or microphone 450.

Removing the I2S bus introduces a significant amount of uncertainty into the digital audio system. As a brief aside, the I2S bus includes an explicit clock (SCK) and word select (WS). The I2S transmitter generates data (SD). I2S operation is described in e.g., the I2S bus specification, originally published in February 1986 (later revised in June 1996), by Philips Semiconductors, the foregoing being incorporated herein by reference in its entirety. Existing digital audio software and hardware assume that I2S data is provided with an accurate clock (SCK); in fact, the raw PCM data of FIG. 4 does not have any explicit time reference (the passage of time is solely indicated by SCK). Since the IPC isolates the AP 402 from the cellular BB 404 and vice versa, neither the AP 402 nor the cellular BB 404 have a reliable reference for the other processor's time base. Thus, even though the IPC link allows the AP 402 to transmit and receive PCM data to and from the cellular BB 404, if the cellular BB 404 consumes or generates the PCM data too quickly or too slowly, then the audio quality will be perceptibly diminished (e.g., the listener will hear "pops", "echoes", "clicks", and/or any number of other undesirable audio effects).

In one exemplary embodiment, the AP 402 and/or cellular BB 404 determine a relative clock drift and compensate for playback by e.g., adding, padding, or deleting audio samples and/or audio packets as described in e.g., co-owned U.S. patent application Ser. No. 15/720,603, filed Sep. 29, 2017 and entitled "METHODS AND APPARATUS FOR TRANSMITTING TIME SENSITIVE DATA OVER A TUNNELED BUS INTERFACE", the contents of the foregoing incorporated herein by reference in its entirety. More directly, the AP 402 can infer a relative clock drift of the cellular BB 404 based on a relative frequency of buffer wrap events because the PCM data generated by Core Audio 406 should be converted to RTP data by the AMR codec 414B at commensurate rates. Thus, PCM data in the transmit buffer of the AP 402 should be depleted for bus transfers at approximately the same rate as the buffer of the cellular BB 404 consumes data for the AMR codec 414B operation and RTP uplink. Differences in buffer depletion correspond to an inferred difference in processor time. In other words, a difference in transmit and receive buffer depth may be used to determine a rate mismatch between the clock domains of the AP 402 and the cellular BB 404.

The exemplary AP 402 of FIG. 4 determines (by indirect inference from e.g., buffer wraps) a schedule for transmission of PCM data to an independently operating cellular BB 404. The AP 402 of FIG. 4 is able to determine that an amount of PCM data has been consumed based on buffer wrap conditions. Beneficially, the system 400 of FIG. 4 reduces the overall physical layout and footprint of the processing system by removing the I2S interface which reduces both pinout and associated board routing. Additionally, the digital system 400 can be implemented with minimal changes to the software of both the AP 402 and cellular BB 404 because the underlying logical functionality of the processors has not changed. A minimal change to the hardware abstraction layer (HAL) software can encapsulate I2S PCM data within the IPC data packets and speed up/slow down PCM data generation based on the buffer wrap events.

It should be noted however, that the aforementioned AP 402 only has an approximation of the cellular BB 404 schedule, and does not have explicit scheduling information for the cellular BB 404. Consequently, the AP 402 and cellular BB 404 may still maintain duplicate components and/or functionalities (e.g., AMR codec 414A, 414B). While the digital audio subsystem 400 of FIG. 4 provides some improvements over the prior art solutions (e.g., digital audio subsystem 300 of FIG. 3), further improvements and optimizations may be available for systems that explicitly coordinate time schedules. For example, one or more processors may efficiently schedule its own tasks (e.g., by prioritizing and/or deprioritizing its own processes) relative to the other processor, and vice versa. Moreover, explicit scheduling may enable software on one processor to seamlessly handle tasks traditionally performed by the other processor.

Figure 5:
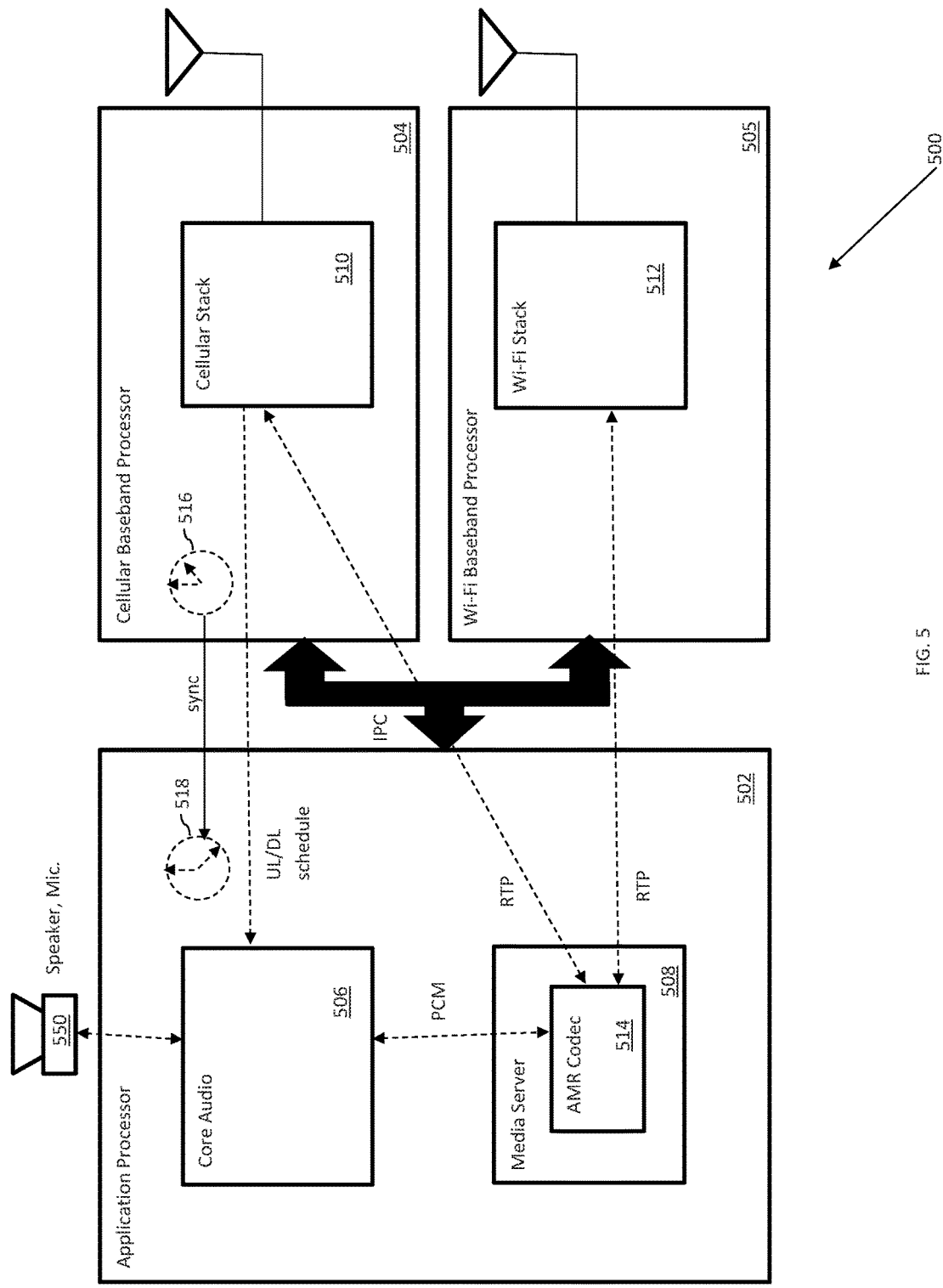
FIG. 5 is a logical block diagram of a second audio delivery scheme for use within a cellular network, in accordance with the various principles described herein.

FIG. 5 illustrates a second exemplary digital audio system 500, in accordance with various principles of the present disclosure. As shown in FIG. 5, the application processor (AP) 502 is coupled to the cellular baseband processor (BB) 504 and Wi-Fi baseband processor (BB) 505 via the aforementioned inter-processor communications (IPC) link. Much like the system 400 of FIG. 4, the Integrated Inter-IC Sound Bus (I2S) serial bus interface has been removed from the digital audio system 500; however unlike system 400, the exemplary system 500 further periodically/semi-periodically/intermittently tracks the clock difference between the cellular BB clock domain 516 and a AP clock domain 518 via explicit time synchronization signaling provided on an interface other than the IPC (an "out-of-band" interface). In addition, the uplink and/or downlink transmission schedule timing for the cellular network is additionally updated in accordance with the cellular network allocations. Notably, the network transmission schedule may only change once every radio frame (e.g., 10 ms); in practical implementations, the schedule changes even less frequently due to e.g., semi-static scheduling and/or other fixed allocations. Digital audio can be captured and played back via an internal and/or external speaker or microphone 550.

The uplink and downlink transmission schedule for the LTE cellular network is controlled by the LTE base station (also commonly referred to as an enhanced Node B (eNB)), not the baseband (BB) processor of the LTE user equipment (UE). The LTE eNB identifies the specific time and frequencies that are allocated for each UE or group of UEs that are registered to the LTE cell. The UE's BB uses the LTE uplink and downlink scheduling to determine its own timing and power management; e.g., the BB processor will synchronize its clock to the LTE network time and/or power down into lower power states when the UE does not have any allotted network transactions.

Various schemes for time synchronization may be used by those of ordinary skill in the related arts, given the contents of the present disclosure. In one such exemplary embodiment, the cellular BB 504 synchronizes to the LTE network, and the AP 502 has an independent clock domain. During operation, the IPC link transfers system timestamps between the AP 518 and BB 516 via a dedicated time sync message, provided via the explicit time synchronization signaling provided on an out-of-band interface. The direction of timestamp transfer may be indicated in the message, along with the unit of the timestamp being captured. The timestamps are captured based on a precisely timed trigger.

In one such variant, the timed trigger may be based on a commonly observed "doorbell" signal transmitted over the IPC link (an "in-band doorbell"). The AP may first disable the IPC power management (e.g., based on the Peripheral Component Interconnect Express (PCIe) Layer 1 (L1) Active State Power Management (ASPM)), then may capture a local timestamp and may, for example, immediately ring the aforementioned time sync doorbell. After ringing the doorbell, the AP may re-enable the IPC power management. Ringing the time sync doorbell on the BB causes the BB to latch its timestamp in hardware. At this point, timestamps on both the AP and BB have been captured for a commonly observed event (i.e., the in-band doorbell signaling). In some variants, this scheme may be performed periodically to account for clock drift between the processors, and make the required corrections. Other variants may synchronize on an aperiodic notification or on an as-needed basis (e.g., where looser timing is acceptable and/or where synchronization overhead is constrained).

As a brief aside, disabling the Active State Power Management (ASPM) is primarily motivated by application considerations. Specifically, entering and exiting various power states has an associated latency cost. Thus, in a related variant, if the L1 exit latency is acceptable for the ongoing AP's applications, then the AP may not need to disable the ASPM. In fact, in certain sophisticated variants, the AP may be able to detect and correct for ASPM exit latencies if the latencies are deterministic.

In another variant, a commonly observed external general purpose input/output (GPIO) may be used to trigger the latch operation rather than an in-band doorbell. The GPIO may be driven either from the AP or the BB. Immediately after the GPIO edge, both sides capture their respective timestamps. The timestamps may be transferred via the time sync message. Still other precision capture techniques may be substituted by those of ordinary skill in the related arts, given the contents of the present disclosure. Common examples of such schemes include without limitation e.g., dedicated interrupt lines, edge-based signaling, and/or other latch based logic mechanisms common within the related arts.

The aforementioned time sync message may provide fields to transfer other data. For example, the timestamps may be sent as part of e.g., a synchronous completion descriptor (CD), the footer of a transaction descriptor (TD), and/or any number of other IPC messages. More generally, a time sync message may include any number of preambles, post-ambles, headers, footers, payloads, and/or encapsulated data.

In still other variants, data transfers over the IPC link may be used as a passive synchronization signal. For example, the sender can transmit packets that include a timestamp, and the receiver can compare its timestamp to the sender's timestamp at the time that the transfer is received. Timestamp exchanges may be less precise than other hardware based mechanisms due to e.g., message signaled interrupt (MSI) latencies, however they may be desirable for a variety of other reasons (e.g., software implementations can be used without modifications to existing hardware). For example, software based timestamping solutions are less expensive to manufacture and do not significantly affect power consumption.

In some optimized implementations, synchronization triggers may be transmitted at certain opportune times. For example, a processor may only transmit synchronization triggers when synchronization would not incur significant additional power cost. In one such case, the synchronization signaling may be performed immediately before or after another data transfer (e.g., saving the power costs of bus transactional overhead).

Still other optimizations may incorporate timing information from multiple synchronization mechanisms. For example, the AP 502 and/or cellular BB 504 may combine the higher cost (e.g., dedicated hardware signaling) synchronization techniques when higher precision is needed, but revert to lower cost techniques to reduce power consumption (e.g., software based timestamp signaling).

Referring back to FIG. 5, once the AP 502 has the LTE network timing via the cellular BB 504 schedule and a commonly observed time synchronization event, the AP 502 may execute Core Audio 506 and Media Server 508 software and communicates the resulting RTP packets via the cellular BB 504 and/or the Wi-Fi BB 505 (e.g., the cellular communications protocol stack 510 or the local area communications protocol stack 512). Unlike the digital audio system 400 of FIG. 4, the AP 502 may transact generic time-sensitive RTP data for transmission via either of the communication stacks 510, 512 rather than relying on the cellular BB's 504 internal scheduler. Since the AP 502 can determine the individual BB's time reference based on the synchronization signaling and has the uplink and/or downlink transmission schedule, the AP 502 can generate the RTP packets in time for uplink cellular network transmission and/or anticipate RTP packets reception on the downlink within the AP's own scheduler. In this manner, the AP's scheduler can coordinate/accommodate digital audio tasks within the context of its other tasks (e.g., to enable intelligent sleep and wake-up operation, load balancing, memory usage, and/or any number of other processor management functions).

For example, during normal operation, the AP 502 may receive and/or generate audio data as pulse code modulated (PCM) data to make a voice call over the cellular network. Then, using the AP's internal scheduler to track the LTE network time, the AP 502 may encapsulate the PCM data within RTP packets for transmission over the cellular network; these RTP packets are delivered to the cellular BB 504 in time for LTE uplink transmission. Thus, in the illustrated implementation of FIG. 5, the Media Server 508 (executed by the AP 502) is optimized with an AMR voice codec 514 that can be used in either VoLTE or Wi-Fi based teleconferencing.

As previously alluded to, time synchronization for the cellular BB 504 is critical for cellular network scheduling, and digital audio codec operation may operate according to a looser time criteria without affecting perceived sound quality. Consequently, in the illustrated embodiment, the AP 502 and cellular BB 504 closely align timing, whereas the AP 502 and Wi-Fi BB 505 may rely on underlying synchronization signaling within RTP. Artisans of ordinary skill in the related arts will readily appreciate that in other implementations, the AP 502 may need to manage multiple different time references e.g., where there are multiple different time constrained basebands or other similarly constrained media processors.

One significant benefit of the aforementioned scheme is that it allows for significantly reduced baseband requirements in both memory and processing speed. For example, an AMR codec is no longer required within the cellular BB 504. Offloading non-essential baseband tasks from the baseband processor greatly reduces the overall baseband memory footprint and/or processing complexity, thereby enabling the use of lower cost commodity baseband processors and/or size and power optimized baseband processors. For example, an LTE communications stack may be operated within a memory footprint of less than 32 Mbits. As a point of comparison, existing baseband designs (that include many features including e.g., vocoder functionality) may exceed 1 Gbit of memory.

In addition to the advantages of reducing the cellular BB 504 memory footprint and processing complexity, the execution of the AMR codec within the AP 502 is additionally preferred for flexibility of use. As previously noted, the cellular BB 504 firmware is seldom updated once a device has been deployed, and such updates are even more rarely concerned with peripheral operations (such as an AMR codec). However, customers directly interact with device manufacturers and commonly expect that their devices can be updated so as to e.g., support new features, patch problems, etc. To these ends, many manufacturers regularly push updates to the AP operating systems (O/S). By implementing the codec within the AP O/S, the device manufacturer can control the software distribution of various customer-centric applications (such as the aforementioned voice codec). For example, while existing designs are based on the Adaptive Multi-Rate (AMR) codec, future improvements to codec design are currently being proposed under so-called Enhanced Voice Services (EVS). EVS will be a speech audio coding standard that provides, for example, 20 kHz audio bandwidth and has high robustness to delay jitter and packet losses. EVS may support channel aware coding and improved packet loss concealment. Future updates to replace the AMR codec with an EVS codec (or to make subsequent improvements to the EVS codec) may be handled by pushing O/S updates into the AP's software.

Still another significant benefit of the aforementioned scheme is that the generic RTP data is "opaque" to the underlying communications stack. As previously alluded to, existing systems already support VOIP teleconferencing over Wi-Fi via RTP. Artisans of ordinary skill in the related arts, given the contents of the present disclosure, will readily appreciate that an existing VoLTE RTP session can be migrated to Wi-Fi RTP and vice versa since both VoLTE and VOIP natively route RTP data. Such seamless handover between different radio access technologies (RATs) will be critical for future developments in wireless connectivity, including without limitation, proposed developments in so-called "5G" (5th Generation) mobile networks.

More directly, a myriad of techniques for migrating RTP data sessions may be used to handover a VoLTE session to a VOIP application (or vice versa). In one such exemplary embodiment, different clock domains between each of the handover clock domains may be handled by the RTP communication stack which operates at a level of abstraction above the LTE to Wi-Fi communication stacks. This level of abstraction enables the RTP communication stack to manage and correct for timing mismatch of the packets without affecting higher layer LTE and Wi-Fi communications stack operation. As previously noted, the LTE and Wi-Fi communications stacks may internally manage the actual uplink and downlink transmission timing treating all RTP packets generically (i.e., without regard to their specific application requirements).

While the foregoing discussion is provided within the context of an AP 502 and a cellular BB 504 in communication with an LTE network (not pictured), artisans of ordinary skill in the related arts will readily appreciate that the disclosed embodiments may be used with a variety of more complicated logical network topologies. For example, RTP data may be broadcast, multicast, routed over a number of intermediary nodes and hubs, re-routed, and/or any number of other networking manipulations. Moreover, the specific application of RTP data within the context of VoLTE and VOIP is purely illustrative; the principles of the present disclosure are applicable to virtually any application that is subject to real-time roundtrip delay. Common examples include e.g., audio, video, gaming, human interface, security, and/or other real-time or time sensitive applications.

Methods—

Figure 6:
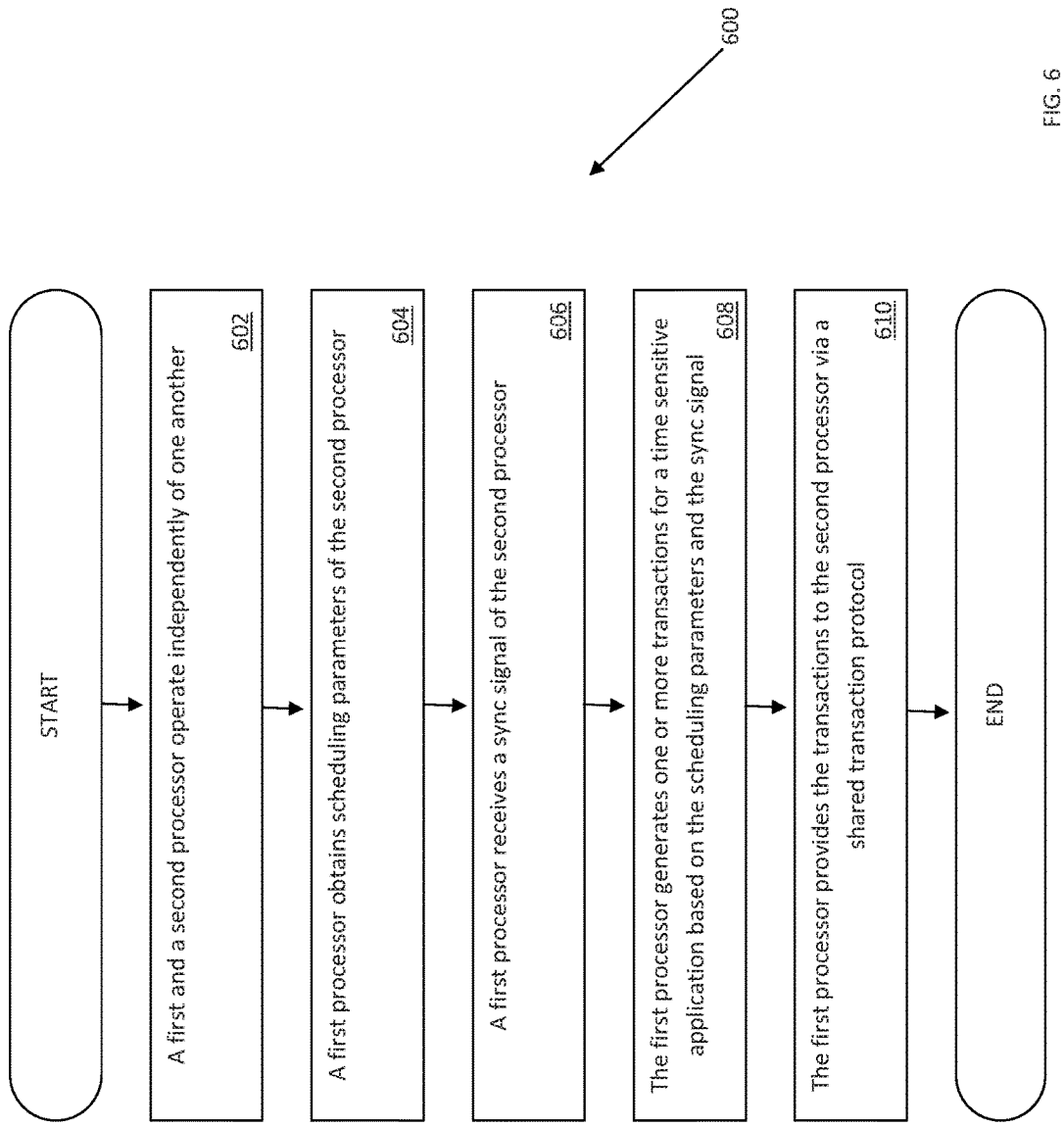
FIG. 6 is a logical flow diagram of one generalized method for scheduling time sensitive operations among independent processors.

FIG. 6 is a logical flow diagram of one generalized method 600 for scheduling time sensitive operations among independent processors such as, for example, the AP's and BB's of FIGS. 1, 2, 4 and 5.

At operation 602 of the method 600, a first and a second processor are operated independently of one another. In one exemplary embodiment, an application processor (AP) executes an operating system (O/S) and applications, and a baseband processor (BB) executes one or more communications stacks independent of the AP.

As used herein, a "processor" refers generally to any logic or circuitry that responds to and processes computer-readable instructions that are stored within, for example, a computer-readable medium e.g., a memory. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power.

Common examples of processors include without limitation, application processors (AP), baseband processors (BB), media processors, network processors (e.g., network routers, gateways, hubs, and/or other network accelerators), hardware accelerators, graphics processors, digital signal processors (DSP), field programmable gate arrays (FPGA), application specific integrated circuits (ASIC), neural networks, artificial intelligence (AI) engines, security modules, and/or any other processing logic.

As a brief aside, so-called "application processors" are processors that are configured to execute an operating system (O/S) and one or more applications, firmware, and/or software. The term "operating system" refers to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

A so-called "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band networks.)

As used herein, the term "independent" refers to a processor in a processing system having one or more of the processor clock domain, processor power domain, processor code base, arithmetic units, registers, and/or memory, isolated to allow the processor to operate without other processors in the processing system. In one exemplary embodiment, an independently operable processor may transition into various power-conserving modes independent of the power-conserving modes of other ones of the plurality of sub-systems. In another embodiment, an independently operable processor may adjust its clock frequency, phase, and/or amplitudes, independent of the power-conserving modes of other ones of the plurality of sub-systems. In still another embodiment, an independently operable processor may reboot and/or update its firmware or software independent of the software execution of other ones of the plurality of sub-systems.

While the present disclosure is primarily directed to processor based operations, artisans of ordinary skill in the related arts will readily appreciate that the various techniques described herein may be applied with equivalent success to any number of other logic and/or circuitries. Common examples of such logic include without limitation: memories, processors, arithmetic units, field programmable gate arrays, programmable logic devices, application specific integrated circuits, and/or any number of other semiconductor devices.

In one embodiment, the first and second processor may communicate via a bus interface. In one embodiment, the processors may access the bus interface independently of the other processors. For example, in one exemplary embodiment, an application processor (AP) and a baseband processor (BB) may communicate via an inter-processor communications (IPC) link. In other embodiments, one or more processors may control and/or direct traffic on the bus as a bus master. Still other embodiments may allow the processors to arbitrate for control of the bus (e.g., to enable multiple processors to contend for control of the bus dynamically). Various other schemes for bus management may be substituted with equal success by artisans of ordinary skill, given the contents of the present disclosure.

In some embodiments, the bus interface may directly connect the processors. In other embodiments, the bus interface may incorporate one or more memories and/or traffic controllers to e.g., enable time shifted and/or out-of-order bus accesses. In some embodiments memories and/or traffic controllers may be incorporated with one or more of the processors. For example, in one such implementation, a processor may have a memory that stores one or more packets for delivery. Such delivery may be further meted out according to "best-effort" (non-prioritized) or a priority-based scheme. Priority may be assessed based on timing requirements, assigned priority, congestion, content, and/or any number of other factors.

In one exemplary variant, the bus interface may allocate dedicated resources and/or preferentially route certain data. For example, an AP and a BB may prioritize time-sensitive data sessions for IPC bus routing over non-time sensitive IPC traffic (or less time sensitive IPC traffic) in order to guarantee real-time delivery. The exemplary time-sensitive transactions may be prioritized over data transactions that may introduce latency including e.g., message signal interrupt (MSI) mitigation, doorbell mitigation, and other interrupt based signaling. More generally, virtually any resource prioritization scheme may be substituted with equivalent success by those of ordinary skill, given the contents of the present disclosure. Common examples of such optimizations include without limitation: dedicated bus lanes, dedicated time slots, prioritized routing classes, interrupt based routing, etc.

In one such implementation, the time-sensitive transactions include Real-time Transport Protocol (RTP) data packets via the IPC link. For example, during a voice call, the BB receives the downlink digital audio which is provided to the AP for playback over the speaker. In the reverse direction, the subscriber's voice is received via a microphone of the AP and processed into digital audio for transmission to the network via the BB. While the aforementioned link between the AP and BB is bidirectional (e.g., between two or more transceivers), the described techniques are equally applicable to unidirectional links (e.g., where only a transmitter transmits signals to a receiver). As should be further appreciated, the time-sensitive transactions may further include RTP Control Protocol (RTCP), Real-Time Streaming Protocol (RTSP), and/or user datagram protocol (UDP) transactions.

As a brief aside, a "transaction" refers to any unilateral and/or bilateral communication between two or more logical entities. Logical entities may be disposed at a single processor, virtualized within a hybrid processor, and/or located at a remote entity (e.g., a cloud based logical entity).

As used herein, a "time sensitive transaction" is a transaction that must be performed within a time constraint. Generally, time constrained transactions may be performed with one or more of the following requirements: synchronous data transfer, isochronous data transfer, asynchronous data transfer, with a maximum/minimum latency, with a minimum/maximum throughput. Common examples of time sensitive protocols include without limitation e.g., real-time protocol (RTP) protocols, streaming applications, audio transactions, visual transactions, human interface applications.

At step 604 of the method 600, a first processor obtains one of more scheduling parameters of the second processor. The scheduling parameters may be read by the first processor, or written to the first processor from the second processor. In one exemplary embodiment, an application processor (AP) may request and/or receive the uplink and downlink schedule of an LTE network from a baseband processor (BB). Still other systems may provide the scheduling parameters via some means other than the second processor; for example, both first and second processor may receive the scheduling parameters via a $3^{rd}$ party authority or user configuration. As a brief aside, while digital audio and video are constrained to specific periodic frequencies, other real time applications may have variable scheduling to accommodate application specific considerations such as response times, power consumption, data depth, and/or any number of other bandwidth considerations. Location determination (e.g., GPS), personal fitness applications, online gaming and other human interaction applications have wide divergences in scheduling constraints; e.g., location tracking can be performed at very long intervals, whereas online gaming may need very short response times to support fluid game operation.

In one embodiment, the scheduling parameters may be a fixed schedule of events. For example, within the context of a Long Term Evolution (LTE) network, the modem may have a fixed interval to receive data on a downlink and a separate interval to transmit data on an uplink. In other embodiments, the scheduling parameters may be a dynamically changing schedule of events. Within the context of a LTE network, each user may be dynamically allocated certain uplink and downlink resources which may dynamically change at periodic intervals (as frequently as every radio frame (10 ms)).

Still further, the scheduling parameters may encompass more loose timing parameters than a fixed schedule of events; for example, scheduling parameters may describe periods of time which have some probability of availability and/or some interdependency of availability. For example, within the context of an LTE network, each user may periodically check for paging messages, which are associated with a certain probability of success. When a paging message is successfully received, the BB may be further unavailable for a period of time to decode the paging message and any subsequent tasks; e.g., unavailability due to mobility management updates may be dependent on receiving a mobility management page. In some cases, task information and/or priority may be further provided to the processor to further improve task scheduling e.g., certain mobility updates may be low priority and can be overridden for more important tasks.

More generally, artisans of ordinary skill in the related arts will readily appreciate that scheduling parameters may include any combination of task information, time information, duration, priority, probability, sequence, dependency, historic usage, and/or any other parameter useful to predict the second processor's future activity. Still other possible scheduling constraints may be substituted with equivalent skill, by those of ordinary skill in the related arts, given the contents of the present disclosure.

In some cases, the scheduling parameters may combine and/or describe multiple co-existing systems and/or tasks of the second processor. For example, a modem baseband may simultaneously provide cellular network connectivity (e.g., LTE), wireless local area network (WLAN) connectivity, and/or personal area network connectivity (PAN) (e.g., Bluetooth). In one exemplary use scenario, a device providing voice call connectivity via a Bluetooth headset may be required to dynamically prioritize both the Bluetooth uplink and downlink scheduling as well as the LTE network's uplink and downlink timing. Moreover, certain communication stacks may interfere with one another; for example, Wi-Fi and Bluetooth often interfere with one another due to their shared usage of, for example, Industrial Scientific and Medical (ISM) frequency bands. Thus, even where Wi-Fi connectivity might be available, the BB processor may still indicate unavailability due to concurrent Bluetooth activity.

In a related note, the scheduling parameters may encompass multiple clock domains of the second processor. Many consumer electronics may synchronize to one or more of a base station time reference, a Wi-Fi access point (AP) time reference, a Global Positioning System (GPS) time reference, and any connected Bluetooth ad hoc network time references. Different communications stacks may each have varying degrees of timing drift relative to one another. Such cross-platform differential timing is implicated in hybrid applications where two or more communication stacks may be used in a single application. For example, a BB processor may be independently tracking a Bluetooth and a LTE reference time simultaneously to support e.g., a LTE voice call over a Bluetooth headset. Similarly, a BB processor may independently track Wi-Fi timing and a GPS timing to provide location based data services.

In view of the myriad of potential clock domain scheduling parameters, the scheduling parameters may be received and/or updated on an aggregated basis. Alternatively, the scheduling parameters may be received and/or updated on an individual or otherwise piecemeal basis. In one such variant, the AP software may only receive or request scheduling parameters for a subset of the available communication stacks. In alternative cases, the BB software may provide scheduling parameters for only a subset of its communication stacks. Implementations that purposely limit the accuracy or detail of scheduling may be useful where the same software is used with different components. Differentiable hardware with common software is often used e.g., to address different market segments as well as to enable multi-sourcing of components and encourage competitive markets to keep pricing low.

In some cases, scheduling parameters may be periodically updated. For example, within the context of LTE networks, the modem's uplink and downlink parameters may change every radio frame (e.g., every 10 ms), thus a BB processor may need to provide appropriate scheduling parameters to the AP on the same periodic basis. In some cases, scheduling parameters may be intermittently updated; for example, LTE networks support semi-persistent scheduling (SPS) which grants allocations over varying intervals of radio frames. In still other cases, the scheduling parameters may be updated when needed. For example, unlike cellular connectivity, Bluetooth connectivity may not always be available. However when Bluetooth is available, connectivity is provided via an established time slot; thus the BB may provide Bluetooth specific scheduling parameters when a link is enumerated. Moreover, certain communication technologies may provide persistent or semi-persistent link allocations that only change infrequently; such scheduling parameters may be updated only when the information changes.

In some cases, the second processor's schedule may be obfuscated for e.g., security reasons and/or software abstraction. For example certain processor functions (e.g., encryption and security) may be intentionally isolated from other processor functions. Consequently scheduling information for such activity may not be provided to external processors. In such variants, the second processor may only indicate periods of availability, unavailability, indeterminacy, or some degree thereof. While less scheduling information provides fewer opportunities to coordinate scheduling, such embodiments may also be desirable to reduce signaling overhead and scheduling complexity.

At step 606 of the method 600, the first processor receives a synchronization signal associated with the second processor. As used herein a "synchronization signal" refers to a signal or event which corresponds to a known time within multiple clock domains. Common examples of such synchronization signals may include general purpose input outputs (GPIOs), interrupts, dedicated hardware signaling, and/or any number of other signaling mechanism.

In some embodiments, the synchronization signal may be transmitted by the second processor. In alternative embodiments, the synchronization signal may be transmitted by the first processor. In some hybrid variants, the synchronization signal may jointly controlled by both processors (e.g., via an "arm and fire" scheme). Still other synchronization signals may be wholly outside the control of either processor; for example in some implementations, the synchronization signal is commonly observed by both the first and the second processor.

As used herein, the term "clock domain" broadly refers to any time reference associated with a logical or physical entity. More directly, sub-components and sub-entities within a single clock domain will perceive the passage of time substantially identically.

As used herein, a "time reference" broadly refers to any temporal scheme or identifier useful for ordering a sequence of events in time. In one exemplary embodiment, a reference event or series of events that mark the passage of a processor's experienced time is used as a time reference. Generally, time references correspond to a clock signal generated by e.g., a phase locked loop (PLL), analog PLL (APLL), digital PLL (DPLL), delay locked loop (DLL), or other clocking mechanism. However, other examples of time references include event based time references and time stamp based time references. For example, non-clock events can be used to mark the passage of time (e.g., buffer wrap events, received time stamps).

As a brief aside, a timestamp may be the time at which an event is recorded, or scheduled to occur, by a processor. From a practical standpoint, processor captured timestamps may not always indicate the actual time that the event occurred because a processor may have executed an intervening task between the generation of the timestamp and the event. Thus, in one exemplary embodiment, the first and second processors capture timestamps with dedicated hardware logic circuits. In one such exemplary variant, each processor has a latch or a flip-flop circuit that is triggered by the toggling of a commonly observed signal (such as a GPIO). In this manner, both processors have an accurate representation of a single timestamp to synchronize operation therefrom (e.g., by converting the second processor's time stamp to the first processor's clock domain and vice versa).

As a brief aside, "clock drift" between processors is a result of different processors having different clock generation hardware, device tolerances, operating environments, and/or any number of other factors that result in slight differences in the perceived passage of time. Drift may also be incurred through other mechanisms. For example sleep exit latencies may be introduced across different power domains because different processors may be awake at different times; similarly, each processor's clock will "ramp up" differently during power on and "ramp down" during power off. Moreover, in some cases a processor may experience clock latencies due to processing burden e.g., switching execution contexts, or processing threads.

As previously noted, the application processor (AP) and a baseband (BB) may each have an independent clocking subsystem that operates independently of the other. As a brief aside, the AP clock rates are usually selected on the basis of performance, cost, and/or power considerations. For example, an AP processor may be overclocked to achieve maximum processing performance. Alternatively, an AP processor may be under-clocked to e.g., ensure that the processor operates at reliable clock rates, enable commodity component multi-sourcing from vendors that have different native processing speeds, reduce power consumption, and/or any number of other applications specific considerations. In contrast, a BB processor is usually locked to the cellular network system time and resource constraints for cellular network processing. Even when a BB processor performs a task faster (e.g., generate digital audio data for a 10 ms time slot within a few milliseconds), the BB processor may only go to sleep faster and for longer periods of time (i.e., the BB cannot force the cellular network to speed up its system time).

While the foregoing scheme is based on a dedicated hardware circuit, artisans of ordinary skill in the related arts will appreciate that accuracy is a function of the application. Various other techniques may be used with varying complexity and/or accuracy. For example, a processor's natively captured timestamp and corresponding inaccuracy may be acceptable where inaccuracy in timing is insignificant relative to the overall schedule timing. A small difference in time may be irrelevant for scheduling that is magnitudes greater (e.g., milliseconds of difference may not matter on a time scale of seconds or minutes). In some variants, the processors may not differ significantly enough in timing to warrant a timing correction. For example, if both processors' clock domains only deviate within an acceptable degree of certainty, then the overall drift between the processors may be allowed to persist without correction or adjustment.

In the foregoing discussion, processor timestamps are used to measure the passage of time with reference to a processor. Other common schemes for measuring the passage of time for a processor may include e.g., counting clock cycles, counting processor cycles, comparing processor clock speeds, observing sync pulses, and/or any number of other synchronization techniques. For example, a processor may send over a pulse at regular intervals (e.g., every second of its time), over a long enough interval of time differences in clock rates will manifest as a miscount of pulses e.g., the processor may send 499 pulses every 500 seconds, indicating a discrepancy of 1 cycle in 500.

In some cases, one processor unilaterally determines the discrepancy for the other processor. For example, the first processor may determine the second processor's relative drift. In other cases, both processors determine a discrepancy for the other processor e.g., the first processor identifies a clock drift for the second processor and vice versa. In still other cases, both processors determine a drift relative to a single shared time reference. Various other techniques may be substituted with equivalent success, by those of ordinary skill in the related arts given the contents of the present disclosure.

In some embodiments, the first processor or the second processor may additionally try to correct for the difference by synchronization with the other processor. In some variants, the synchronizing of time reference may include increasing or decreasing a clock speed of the first processor. Synchronizing of a time reference may include dividing and/or multiplying one or more clock cycles of the first processor. In still other variants, the synchronizing of a time reference may include rewriting, incrementing, and/or decrementing a time value of the first processor. Other common examples of time reference synchronization may include without limitation e.g., speeding up/slowing down the time reference, pulse swallowing/insertion, clock resetting, etc. Moreover, analog clock synchronization may be readily achieved with e.g., feedback loops for a phase locked loop (PLL), analog PLL (APLL), digital PLL (DPLL), delay locked loop (DLL), etc. Still other methods for adjusting a time reference will be readily appreciated by those of ordinary skill in the related arts given the contents of the present disclosure.

At step 608 of the method 600, the first processor generates one or more transactions for a time sensitive application based on the scheduling parameters and the synchronization signaling.

In one exemplary embodiment, an application processor (AP) performs a digital audio codec operation for placing a cellular network call. More generally, those of ordinary skill in the related arts will readily appreciate that the various principles of the present disclosure may be readily applied to "virtualize" any task of the baseband (BB) according to the BB's second clock domain. For example, the AP may receive and process GPS data, manage a Wi-Fi and/or BT call stack, interface with other peripherals, control modem power state, and/or any number of other traditional BB processor functions.

As used herein, a "task" or a "process" refers to an instance of a computer program that is being executed by a local processor or logical operation that is performed in local hardware. Depending on the operating system (O/S), a process may be made up of multiple sequential instructions ("threads of execution") or logic that are concurrently executed. A "virtualized task" or a "virtualized process" refers to an instance of a computer program that is being executed by a local processor (or local hardware) to emulate a process of a remote processor or a logical operation that is performed in remote hardware. More directly, virtualized tasks are executed within an emulated domain (e.g., clock, power, etc.) of a different processor.

In one exemplary embodiment, the virtual task of the second domain is a time sensitive application that operates based on one or more time sensitive transactions. A "time sensitive transaction" is a transaction that must be performed within a time constraint. In some cases, the time constraint may be imposed by a network, application, or device constraint (such as a round-trip delay requirement imposed by cellular networks). In other cases, the time constraint may be configurable or dynamically adjustable e.g., to suit various application or human interface considerations. Common examples of time sensitive transactions may include without limitation e.g., real-time protocol (RTP) transactions, streaming applications, quality-of-service (QoS) guarantees, audio transactions, visual transactions, human interface applications.

In one such variant, the virtual task is a media application. In one exemplary variant, the media application is a digital audio codec. For example, in one exemplary implementation, the media application is an Adaptive Multi-Rate (AMR) digital voice codec. In other implementations, the media application is an Enhanced Voice Services (EVS) digital voice codec. Other examples of common media applications may include, without limitation, audio codecs, visual codecs, capture and/or rendering of multi-media, network communication, media processing, memory management, power management, encryption/decryption, security management, digital rights management, human interface (e.g., audio, visual, tactile interfaces).

While exemplary embodiments are described in the context of voice applications and digital audio running on an application processor (AP) and baseband (BB), artisans of ordinary skill will readily appreciate the plethora of use cases which involve hybrid processor transactions. A "hybrid processor transaction" is an operation that requires functional capabilities of multiple independently operable processors. Hybrid processor transactions usually require time sensitive transactions in order to ensure that one processor's tasks do not unduly affect another processor's scheduling. Common examples of processor functionalities may include without limitation e.g., network communication, media processing, memory management, power management, encryption/decryption, security management, digital rights management, human interface (e.g., audio, visual, tactile interfaces). For example, online gaming and streaming video may be managed by an AP in conjunction with a BB for connectivity. Another such example is location-based tracking applications which are executed by the AP, but which relies on Global Positioning System (GPS) demodulation performed by the BB and/or accelerometers, altimeters, etc. Still other applications may include security, biometrics, and/or user authentication, fitness tracking and/or "wearable" type applications, virtual and augmented reality type applications, etc.

In one embodiment, the virtual task of the second domain is a power sensitive application. As used herein, a "power sensitive transaction" is a transaction that must be performed within a power constraint. Common examples of power sensitive transactions include without limitation e.g., sleep management operations, hosting power to another, processor over-clocking, etc. In one such example, a BB processor may independently manage its own power state during default operation, however the AP may receive and/or inform the BB of additional considerations which affect the BB power states. For instance, while the BB may independently power on/off to e.g., receive discontinuous receptions or transmissions (DRX) according to a default timing schedule, the AP may be set to ignore incoming DRX during a "blackout" mode (or other user-configured setting). By informing the BB of the user-configured blackout, the BB can adjust its power consumption accordingly by e.g., lengthening periods between DRX reception and/or disconnecting from the cellular network. Still other variants may leverage precision timing information to reduce transactional latency, or the power cost of transferring data over the IPC link.

As previously alluded to, processor scheduling allocates a processor's time, cycles, and/or power to specific tasks or threads. Processor scheduling can by optimized by assigning a weight to individual tasks (thereby ensuring that higher priority tasks are handled faster, or that lower priority tasks are not completely ignored). Various embodiments of the present disclosure can further optimize operation by considering both its tasks as well as its virtualized tasks to e.g., optimize processor load, memory management, and/or power consumption. For example, an AP that is executing a virtualized digital audio code task can buffer audio and postpone generation of data packets if other intervening tasks are of higher priority.

In one variant, the virtual task of the second domain may be associated with a particular priority. In some cases, the priority may be based on either the first or second processor's prioritization. For example, an application processor (AP) may assess a priority for voice codec operation based on its own considerations. Alternatively, an AP may assess a priority for voice codec operation based on the baseband (BB) processor's priority scheme. Still other systems may assess a priority based on an aggregated priority for both processors. For instance, the AP may consider all of the tasks of a device (regardless of whether an AP or BB performs them) and assign a corresponding value.

A processor may prioritize tasks and virtual tasks based on a plethora of considerations. Common examples of such considerations include without limitation e.g., user assessed importance, latency, throughput, pipeline staging, task redundancy, memory usage, processing time, power consumption, task dependencies, task wait time, system power, network congestion, network bandwidth required, network bandwidth available, and/or any number of other processor considerations (for either processor).

In one exemplary embodiment, an AP can prioritize, schedule, and execute a LTE voice codec or EVS codec and generate digital audio data for an LTE network in conjunction with its other tasks (e.g., operating system and third party applications) based on the scheduling parameters and the synchronization signaling. Specifically, the AP may determine when the digital audio data must be generated in order to meet the required LTE uplink and downlink scheduling based on the synchronization signaling. For example, in one simple scheme, the AP receives a GPIO indicating the start of the LTE frame. The AP determines the appropriate intervals for uplink transmissions, during which voice packets must be ready for delivery. The AP can de-prioritize the codec functionality up until the determined appropriate interval, so as to handle other higher priority tasks and/or enter a low power state. At the determined appropriate interval, the AP escalates the codec functionality for generation of the digital audio codec data.

At step 610 of the method 600, the first processor provides the transactions to the second processor via a shared transaction protocol. In one exemplary embodiment, data for a "virtualized task" may be transmitted as real-time transport protocol (RTP) packets to the baseband (BB), in time for use e.g., transmission via the LTE network. The BB thereafter transmits the RTP packets according to the LTE network scheduling.

As used herein, the term "shared transaction protocol" refers to a protocol for transmitting and receiving transactions that may be used across multiple applications and/or tasks. In some implementations, a shared transaction protocol is a packet based protocol. Common examples of packet-switched shared transaction protocols include without limitation transmission control protocol (TCP) internet protocol (IP), user datagram protocol (UDP) IP, real-time transport protocol (RTP), real-time control protocol (RTCP), etc. In other implementations, a shared transaction protocol is a circuit-switched protocol. Common examples of circuit-switched shared transaction protocols include without limitation asynchronous transfer mode (ATM), time division multiplexing (TDM), synchronous optical networking (SONET) and synchronous digital hierarchy (SDH).

In one exemplary embodiment, the shared transaction protocol may be configured to transmit and receive transactions according to one or more time constraints. Examples of such time constraints include without limitation: isochronous, synchronous, minimum and/or maximum latency, minimum and/or maximum throughput, guaranteed quality of service (QoS), in-order delivery, limited out-of-order delivery, and/or any number of delivery guarantees.

During operation, at least one or more of the processors ensure appropriate delivery according to any scheduling parameters and synchronization signaling. In one exemplary embodiment, a first processor can schedule one or more virtualized tasks of the second processor for execution based on the second processor's scheduling parameters and the synchronization signaling. Artisans of ordinary skill in the related arts, given the contents of the present disclosure, will readily appreciate that either or both of the processors may ensure appropriate delivery; for example, in alternative embodiments, the second processor may schedule one or more virtualized tasks for execution on the first processor based on the second processor's scheduling parameters and synchronization signaling. Still other variations may be jointly negotiated (e.g., where the processors may dynamically control delivery).

In one such implementation, the shared transaction protocol is the real-time transport protocol (RTP). RTP provides facilities for jitter compensation and detection of out of sequence arrival in data. Information provided by RTP may include timestamps (for synchronization), sequence numbers (for packet loss and reordering detection) and/or the source of the stream.

As a brief aside, RTP sequence numbers are sixteen (16) bit values that may be incremented by one (1) for each RTP data packet sent. The sequence number may be used by the receiver to detect packet loss and to restore packet sequence. RTP does not specify any action on packet loss; however various applications may use application-specific corrective action. For example, some applications may pad extra data, insert null data, repeat data, and/or any number of other recovery schemes.

RTP timestamps may be, for example, thirty two (32) bit values that identify the appropriate time for the receiver to play back or render the received data. The sequence of timestamps may be independent in each stream, and may not be used for cross-media synchronization. Similarly, the granularity of timing for each stream is independent (and usually application specific). For example, an audio application's timestamps and clock resolution may differ from a video application's timestamps and clock resolution.

The RTP synchronization source identifier (SSRC) may be, for example, a thirty two (32) bit value that uniquely identifies the source of a stream. The synchronization sources within the same RTP session will be unique. Some streams may additionally include contributing source identifiers (CSRC) where there are multiple sources that generate the RTP stream.

In an alternative embodiment, the processors may internally manage time constraints over a shared transaction protocol; such embodiments may be useful where the shared transaction protocol does not guarantee any time constraints on delivery (e.g., so-called "best effort" protocols).

Under such operation, at least one or more of the processors predict and/or compensate for unconstrained delivery according to the scheduling parameters and synchronization signaling. Various unconstrained delivery may predict delivery time based on e.g., historic delivery, network congestion, processing burden, and/or any number of other bus considerations. For example, a first processor may schedule one or more virtualized tasks of the second processor for execution based on the second processor's scheduling parameters, the synchronization signaling, and/or some margin of error that is attributable to current network congestion. Artisans of ordinary skill in the related arts, given the contents of the present disclosure, will readily appreciate that either or both of the processors may ensure appropriate delivery.

In one such implementation, the shared transaction protocol is the transmission control protocol (TCP) internet protocol (IP). TCP-IP provides best-effort delivery and detection of out of sequence arrival in data. Information provided by TCP-IP includes checksum and acknowledgement bits, sequence numbers (for packet loss and reordering detection) and the source of the stream.

As a brief aside, TCP-IP sequence numbers are, for example, thirty two (32) bit values that are used by the receiver to detect packet loss and/or to restore packet sequence. TCP-IP requires each packet to be acknowledged (ACK) or not-acknowledged (NACK); NACK'd packets may be re-sent to ensure robust connectivity. The receiver verifies the checksum and provides acknowledgement via the acknowledgement fields. TCP-IP additionally includes source and destination ports which are used for hop-based routing of both the initial data and the return acknowledgments.

Referring back to step 610, in one exemplary embodiment, the second processor completes the virtualized task in accordance with the scheduling parameters upon receiving the virtualized task data from the first processor. As previously noted, those of ordinary skill in the related arts will readily appreciate that the various principles of the present disclosure may be readily applied to "virtualize" any task of the baseband (BB) according to the BB's second clock domain. As previously alluded to, the BB may receive e.g., processed GPS data, Wi-Fi and/or BT call stack management data, peripheral data, power state information, and/or any number of other BB task data.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for scheduling time sensitive operations among two or more independently operable processors, comprising:
   obtaining, at a first independently operable processor, scheduling parameters from a wireless network apparatus of a wireless network via a second independently operable processor;
   receiving, at the first independently operable processor, a synchronization signal from the second independently operable processor;
   generating, on the first independently operable processor, one or more transactions for a time sensitive application performed at least partially over the wireless network, based on the scheduling parameters obtained from the wireless network apparatus and the received synchronization signal; and
   providing the one or more transactions to the second independently operable processor via a shared transaction protocol.

2. The method of claim 1, further comprising operating the first independently operable processor independently of the second independently operable processor, the independently operating comprising operating the first independently operable processor within a first clock domain and operating the second independently operable processor within a second clock domain, the second clock domain differing from the first clock domain.

3. The method of claim 2, further comprising executing an operating system (O/S) and one or more applications on the first independently operable processor, and causing the second independently operable processor to connect to the wireless network.

4. The method of claim 3, wherein the obtaining of the scheduling parameters comprises obtaining an uplink and downlink transmission schedule timing for the wireless network.

5. The method of claim 3, wherein the receiving of the synchronization signal comprises receiving an out-of-band general purpose input output (GPIO) edge signal transmitted by the second independently operable processor.

6. The method of claim 3, wherein the receiving of the synchronization signal comprises receiving an in-band doorbell signal transmitted by the second independently operable processor.

7. The method of claim 1, wherein the generating of the one or more transactions comprises executing a digital audio codec to generate the one or more transactions.

8. The method of claim 7, wherein the generating of the one or more transactions for the time sensitive application comprises placing a voice call over a Long Term Evolution (LTE) cellular network.

9. The method of claim 8, wherein the shared transaction protocol comprises supporting multiple real-time applications with a real time transport protocol (RTP).

10. A user apparatus, comprising:
    a first independently operable processor apparatus configured to execute an operating system (O/S) and one or more applications;
    a second independently operable processor apparatus configured to communicate with a wireless network;
    an inter-processor communication (IPC) link coupled to the first independently operable processor apparatus and the second independently operable processor apparatus; and
    a non-transitory computer readable apparatus comprising one or more instructions that when executed by the first independently operable processor apparatus, cause the first independently operable processor apparatus to:
      obtain scheduling parameters from a wireless network apparatus of the wireless network via the second independently operable processor apparatus;
      receive a synchronization signal associated with the second independently operable processor apparatus;
      generate one or more transactions for a time sensitive application performed at least partially over the wireless network, based on the scheduling parameters obtained from the wireless network apparatus and the received synchronization signal; and
      provide the one or more transactions to the second independently operable processor apparatus via a shared transaction protocol and the IPC link.

11. The user apparatus of claim 10, wherein the generation of one or more transactions for the time sensitive application comprises execution of a virtualized task by the second independently operable processor apparatus.

12. The user apparatus of claim 11, wherein the execution of the virtualized task by the second independently operable processor apparatus comprises execution of a digital audio codec for a cellular network application.

13. The user apparatus of claim 12, wherein the cellular network application comprises a voice call.

14. The user apparatus of claim 10, further comprising a second non-transitory computer readable apparatus comprising one or more instructions that when executed by the second independently operable processor apparatus, cause the second independently operable processor apparatus to:
   determine the scheduling parameters based on a wireless network schedule; and
   wherein the wireless network schedule is associated with a Long Term Evolution (LTE) cellular network.

15. The user apparatus of claim 14, wherein the second non-transitory computer readable apparatus further comprises additional instructions that when executed by the second independently operable processor apparatus, cause the second independently operable processor apparatus to:
   transmit the one or more transactions to the LTE cellular network;
   wherein the one or more transactions comprise real-time transport protocol (RTP) packets comprising digital audio data.

16. A first independently operable processor apparatus configured to execute an operating system (O/S) and one or more applications, the first independently operable processor apparatus comprising:
   a processor; and
   a non-transitory computer readable apparatus comprising one or more instructions that when executed by the processor, cause the processor to:
      obtain, at the first independently operable processor apparatus, scheduling parameters from a wireless network apparatus of a wireless network via a second independently operable processor apparatus;
      receive, at the first independently operable processor apparatus, a synchronization signal associated with the second independently operable processor apparatus;
      prioritize a virtualized task associated with the second independently operable processor apparatus with at least one task associated with the one or more applications; and
      based on the prioritization, generate one or more transactions for the virtualized task based on the obtained scheduling parameters and the received synchronization signal.

17. The first independently operable processor apparatus of claim 16, wherein the virtualized task comprises a time sensitive task.

18. The first independently operable processor apparatus of claim 17, wherein the time sensitive task comprises execution of a software digital audio codec.

19. The first independently operable processor apparatus of claim 18, wherein the generation of the one or more transactions comprises generation of one or more real-time transport protocol (RTP) packets.

20. The first independently operable processor apparatus of claim 17, wherein the prioritization of the time sensitive task is based on the obtained scheduling parameters.

* * * * *